(12) United States Patent
Mitra et al.

(10) Patent No.: US 10,730,787 B2
(45) Date of Patent: Aug. 4, 2020

(54) PRECISION COMPONENT

(71) Applicant: SCHOTT AG, Mainz (DE)

(72) Inventors: Ina Mitra, Stadecken-Elsheim (DE); Clemens Kunisch, Armsheim (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 15/987,949

(22) Filed: May 24, 2018

(65) Prior Publication Data

US 2018/0339933 A1 Nov. 29, 2018

(30) Foreign Application Priority Data

May 26, 2017 (DE) .................. 10 2017 208 907

(51) Int. Cl.
*C03C 10/00* (2006.01)
*C03C 10/04* (2006.01)
*C03C 3/097* (2006.01)

(52) U.S. Cl.
CPC .......... *C03C 10/0027* (2013.01); *C03C 3/097* (2013.01); *C03C 10/0009* (2013.01); *C03C 10/0045* (2013.01)

(58) Field of Classification Search
CPC .................. C03C 10/0027; C03C 10/0009
See application file for complete search history.

(56) References Cited

U.S. PATENT DOCUMENTS

| | | | |
|---|---|---|---|
| 3,642,504 A | 2/1972 | Petzold et al. | |
| 4,851,372 A | 7/1989 | Lindig et al. | |
| 5,591,682 A | 1/1997 | Goto | |
| 7,220,690 B2 | 5/2007 | Mitra et al. | |
| 7,226,881 B2 | 6/2007 | Goto | |
| 7,645,714 B2* | 1/2010 | Kawashima | C03C 10/0009 501/4 |
| 7,665,330 B2 | 2/2010 | Nakajima | |
| 7,678,720 B2 | 3/2010 | Nakajima | |
| 8,043,985 B2 | 10/2011 | Yagi et al. | |
| 2003/0125184 A1 | 7/2003 | Mitra | |
| 2005/0197242 A1 | 9/2005 | Mitra et al. | |
| 2007/0293386 A1 | 12/2007 | Goto | |
| 2009/0042710 A1* | 2/2009 | Minamikawa | C03C 10/0027 501/63 |
| 2011/0207591 A1* | 8/2011 | Schreder | C03C 1/004 501/32 |
| 2014/0066285 A1* | 3/2014 | Beall | C03B 20/00 501/32 |
| 2015/0099124 A1* | 4/2015 | Beunet | C03C 3/093 428/410 |
| 2015/0119227 A1* | 4/2015 | Sawai | C03C 10/0027 501/32 |
| 2015/0259239 A1 | 9/2015 | Annamalai et al. | |

(Continued)

FOREIGN PATENT DOCUMENTS

DE 1902432 C 6/1973
DE 102004008824 A1 9/2005
(Continued)

OTHER PUBLICATIONS

Zerodur_Scan_GC-tech_Höland_Beall_2002.
Zerodur_Scan_Low_expan_Bach_1995.

*Primary Examiner* — Karl E Group

(57) ABSTRACT

The present invention relates to a precision component and also to a glass-ceramic which can be used for producing the precision component.

14 Claims, 5 Drawing Sheets

(56) References Cited

U.S. PATENT DOCUMENTS

2016/0130175 A1\*  5/2016  Siebers .................. C03C 3/087
                                                  428/220
2017/0341974 A1\*  11/2017  Beunet .................... C03C 3/093

FOREIGN PATENT DOCUMENTS

| EP | 0587979 B1 | 3/1997 |
| EP | 1900696 A1 | 3/2008 |
| JP | 2003267789 A | 9/2003 |
| JP | 2007326722 A | 12/2007 |
| JP | 2014144915 A2 | 8/2014 |
| JP | 2015110508 A | 6/2015 |
| JP | 2017508713 A | 3/2017 |
| WO | 2015124710 A1 | 8/2015 |

\* cited by examiner

PRECISION COMPONENT

This application claims priority of German patent application DE 10 2017 208 907.5 filed May 26, 2017, the entire contents of which are hereby incorporated by reference.

TECHNICAL FIELD OF THE INVENTION

The present invention relates to a precision component and also to a glass-ceramic which can be used for producing the precision component.

BACKGROUND OF THE INVENTION

Field of the Invention

Precision components are components which are required to satisfy particularly strict requirements in respect of their properties (e.g. mechanical, physical, optical properties). They are employed particularly in astronomy, LCD lithography and microlithography, metrology, spectroscopy and measurement technology. In these areas it is necessary for the components, according to the specific application, to have in particular an extremely low thermal expansion.

In general, the thermal expansion of a material is determined by a static method, in which the length of a test specimen is determined at the start and at the end of the specific temperature interval and, from the difference in length, the expansion coefficient α or CTE (Coefficient of Thermal Expansion) is calculated. The CTE is then reported as the average for that temperature interval—for the temperature interval from 0° C. to 50° C., for example, it is reported as CTE(0;50) or α(0;50).

In order to satisfy the ever-rising demands, precision components have been developed which have a CTE that is better adapted to the particular component. For example, the CTE may be optimized not for the standard temperature interval of CTE(0;50), but instead, for example, for a temperature interval around the actual application temperature, such as the interval from 19° C. to 24° C. CTE(19;24), for certain lithography applications, for example. In order to guarantee even lower thermal expansion at the application temperature, there are some precision components for which it is also possible to shift the zero crossing of the CTE-T curve to the application temperature of the precision component by means of suitable temperature treatment. At the zero crossing, the gradient of the CTE-T curve should also be as low as possible, in order to produce as small as possible a change in length of the precision component in the event of slight changes in temperature.

Description of the Related Art

Known materials for precision components that have a zero expansion in the temperature range around room temperature are ceramics, Ti-doped fused silica $SiO_2$ and glass-ceramics. Glass-ceramics are, in particular, lithium-aluminium-silicate glass-ceramics (LAS glass-ceramics), which are described in, for example, U.S. Pat. No. 4,851,372, U.S. Pat. No. 5,591,682, EP 587979, U.S. Pat. No. 7,226,881, U.S. Pat. No. 7,645,714 and DE 102004008824 A1. Other materials for precision components are titanium-doped fused silica and the ceramic cordierite.

For glass-ceramics, the optimization that is described above for the CTE or for the thermal expansion are generally accomplished, by maintaining the composition and by varying the ceramization conditions.

Despite the fact that the thermal expansion of precision components, and the thermal expansion of the materials constituting the components, have already been optimized by means of these methods, it has hitherto not been possible to maintain the thermal expansion over a sizeable temperature interval, over more than 40 K, for example, at or close to a zero expansion, for example ±0.015 ppm/K, in other words to form what is called a CTE plateau. FIG. 1 shows CTE-T curves of presently available materials for precision components. The glass-ceramic Zerodur® (curve e in FIG. 1) has the following values.

| CTE deviation [ppm/K] | Width CTE "plateau" [K] |
|---|---|
| 0 ± 0.025 | about 47 |
| 0 ± 0.015 | about 37 |
| 0 ± 0.010 | about 30 |

Known Zerodur® has no real plateau. The parabolic shape of the CTE-T curve produces only a narrow region within which there is only little change in the thermal expansion.

Other materials for precision components (cf. curves a to d in FIG. 1) have an even narrower range in which they exhibit expansion of close to 0 ppm/K.

It has also not been possible to optimize the thermal expansion—i.e. a zero crossing of the CTE-T curve or a CTE plateau—for application temperatures of more than 40-50° C.

SUMMARY OF THE INVENTION

The problem addressed by the invention was therefore that of providing precision components, and materials for such precision components, which have a CTE plateau, i.e. an optimized zero expansion over a sizeable temperature interval, i.e. over a range of 40° C. or 40 K or more. A further problem was to provide precision components which exhibit very low thermal expansion even at application temperatures of more than 40° C.

The problem above is solved by the subjects of the claims. Provided more particularly is a precision component which has a CTE-T curve "plateau" and therefore exhibits very low thermal expansion over a temperature interval of 40 K or more.

These and other aspects and objects, features and advantages of the present invention will become apparent upon a consideration of the following detailed description and the invention when read in conjunction with the drawing Figures.

It is to be understood that both the foregoing general description and the following detailed description are merely exemplary of the invention, and are intended to provide an overview or framework for understanding the nature and character of the invention as claimed.

DESCRIPTION OF THE DRAWINGS

FIG. 3 shows a $\Delta l/l_0$-T curve of a glass-ceramic which can be used for producing a precision component according to the invention, while

FIGS. 4 to 6 show CTE-T curves with CTE plateau for glass-ceramics which can be used to produce precision components of the invention.

DETAILED DESCRIPTION OF PREFERRED EMBODIMENTS

The precision components of the invention have a CTE plateau; that is, in a temperature interval $T_P$ with a width of at least 40 K or 40° C., the differential CTE lies or is in a range of 0±0.015 ppm/K, and/or in a temperature interval $T_P$ having a width of at least 50 K it is less than 0±0.025 ppm/K.

According to further embodiments, it is also possible to select a different or more stringent range for the differential CTE, of, for example, 0±0.020 ppm/K, 0±0.010 ppm/K or 0±0.005 ppm/K. For the 0±0.010 ppm/K or 0±0.005 ppm/K case, a temperature interval $T_P$ of at least 30 K, preferably at least 35 K, is already in accordance with the invention.

A restriction on the maximum width of the temperature interval $T_P$ is not desirable in accordance with the invention; it is expected that for a deviation of 0±0.025 ppm/K plateaus with a width of up to 100 K, possibly up to 150 K or else up to 200 K, are achievable.

The determination of plateaus of the CTE-T curve is generally carried out by first determining the differential CTE(T). The differential CTE(T) is determined as a function of the temperature. The CTE is then defined according to the following formula (1):

$$CTE(T) = (1/I_0) \times (\partial I / \partial T) \quad (1)$$

Figure 1:
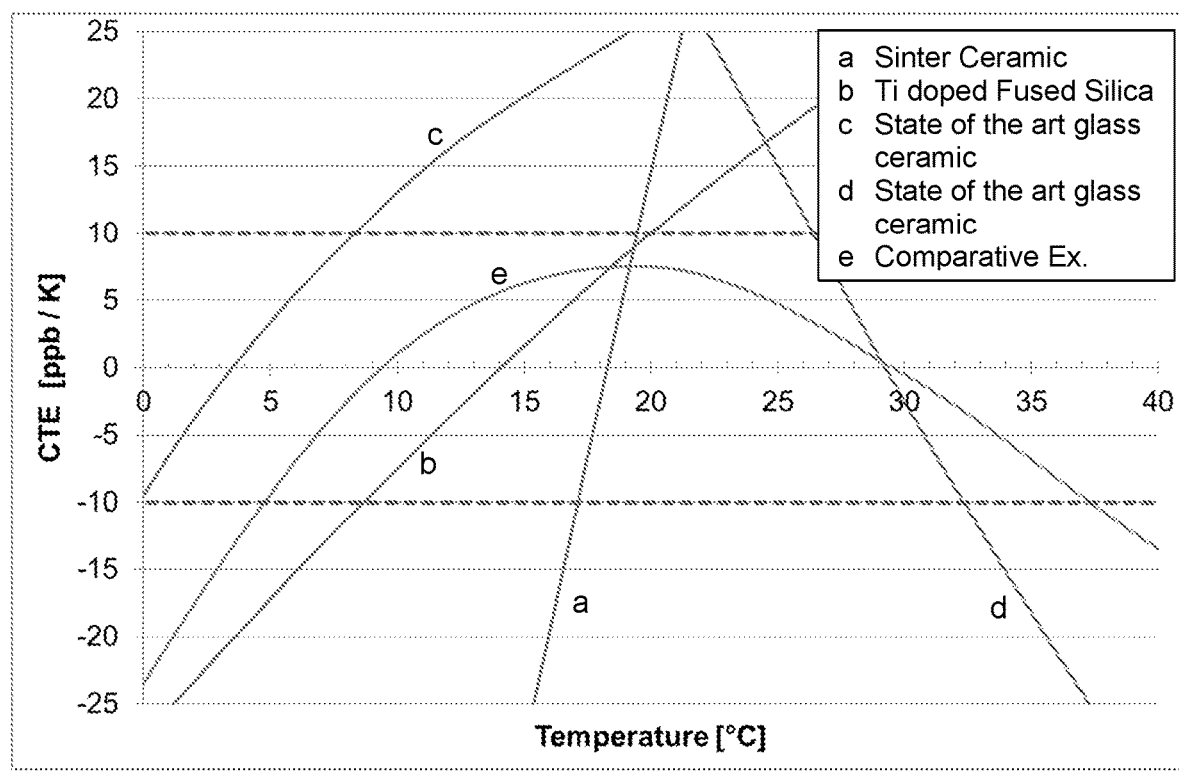
FIG. 1 shows CTE-T curves of state-of-the-art materials with low linear thermal expansion for precision components.
Figure 2:
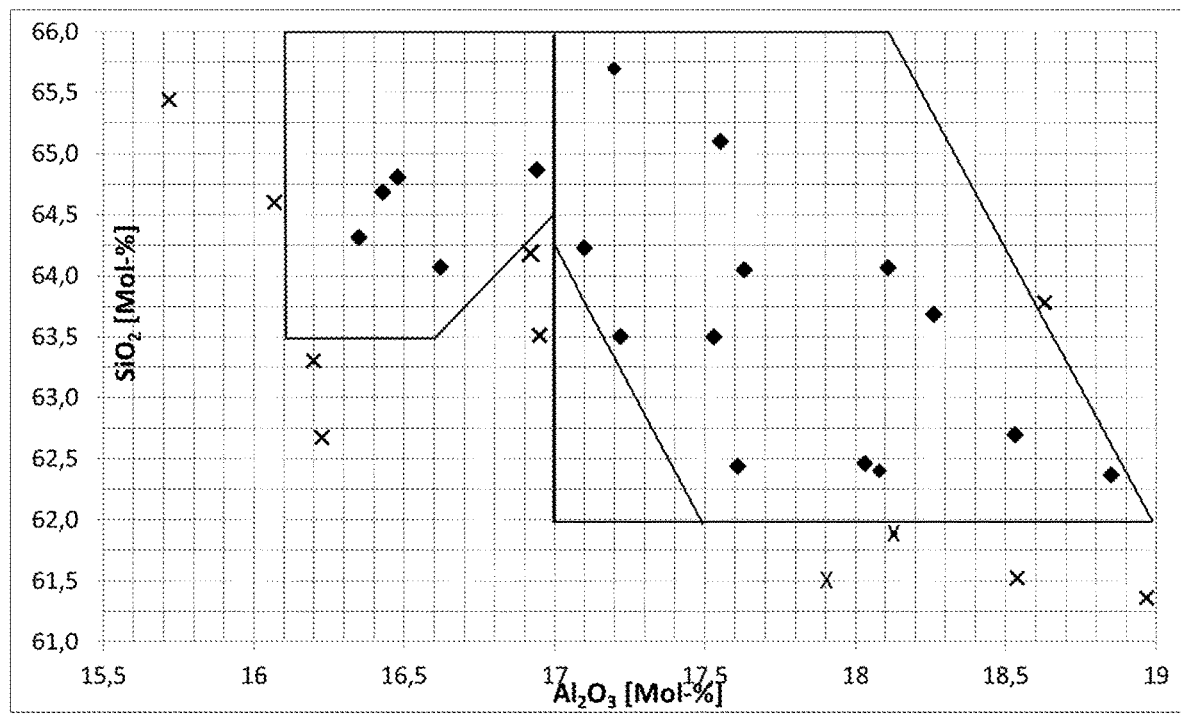
FIG. 2 shows schematically a preferred compositional range for a glass-ceramic composition, and also the position of inventive examples and comparative examples within this range.
Figure 3:
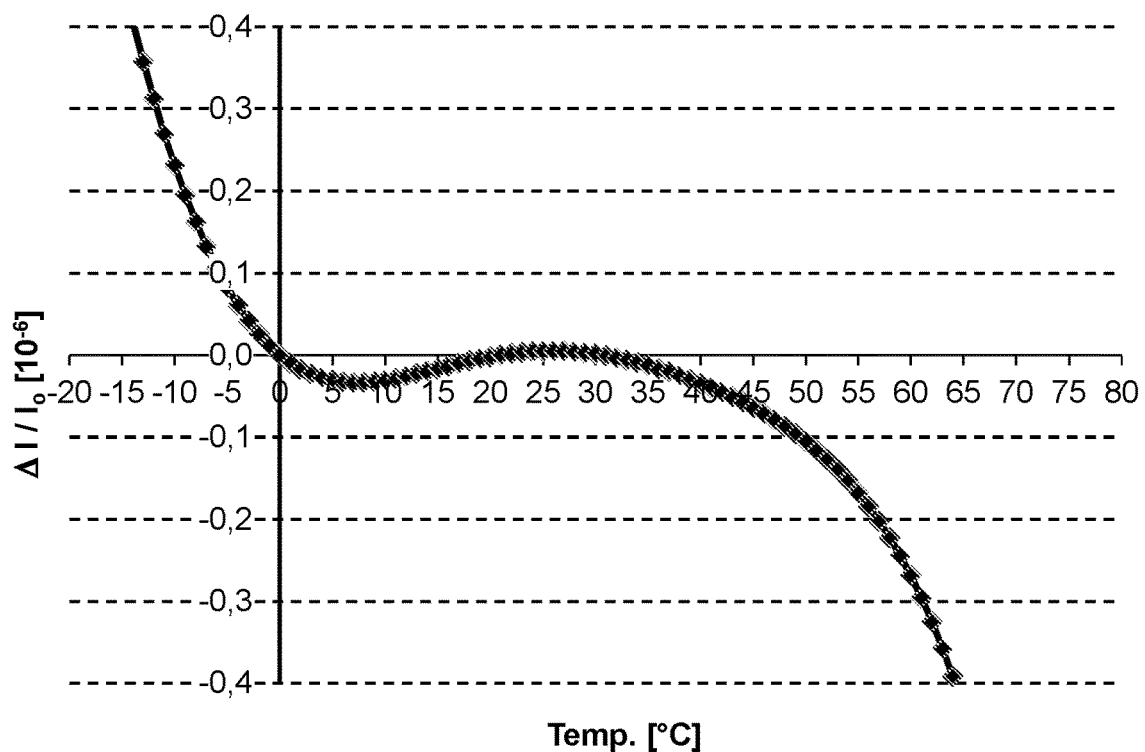
Figure 4:
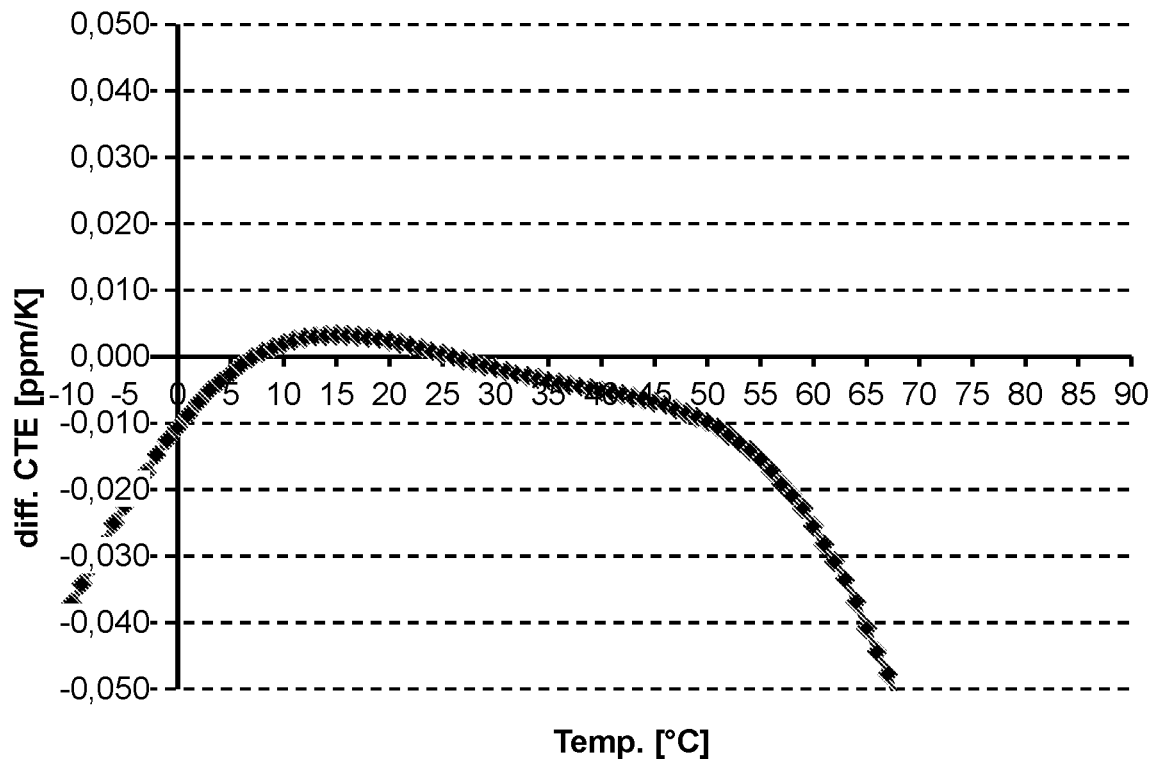
FIG. 4 shows the associated CTE-T curve.
Figure 5:
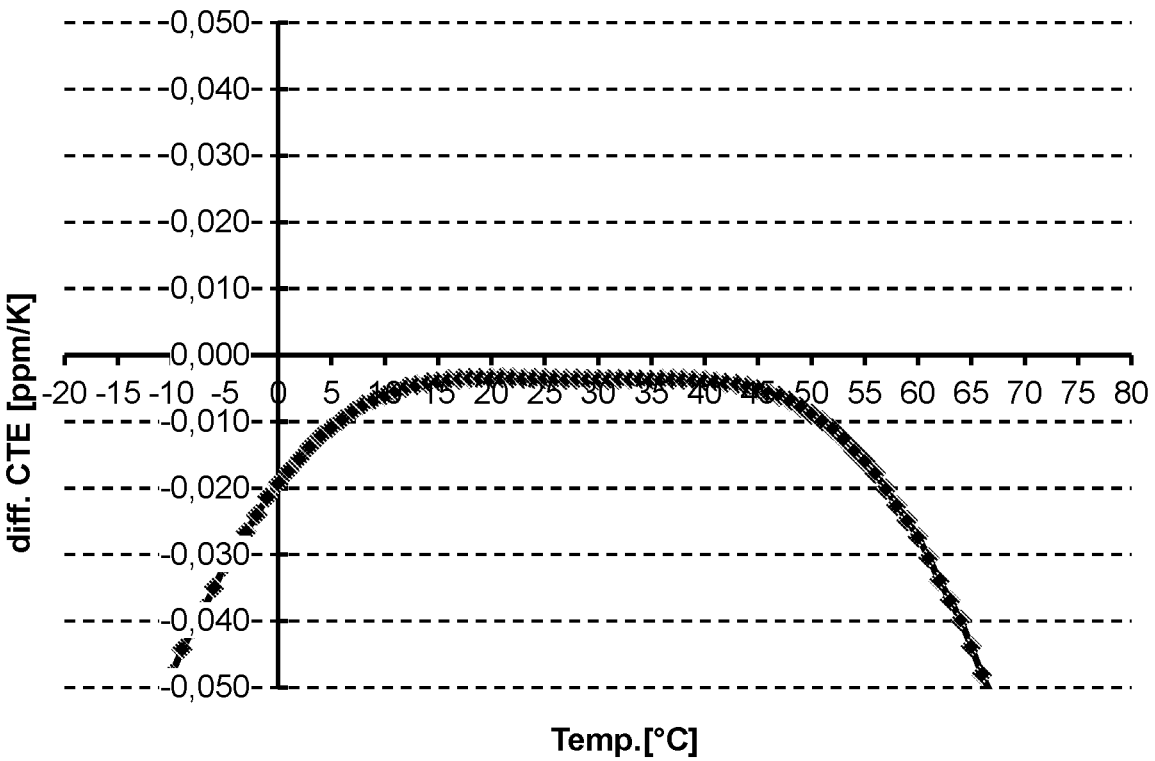
Figure 6:
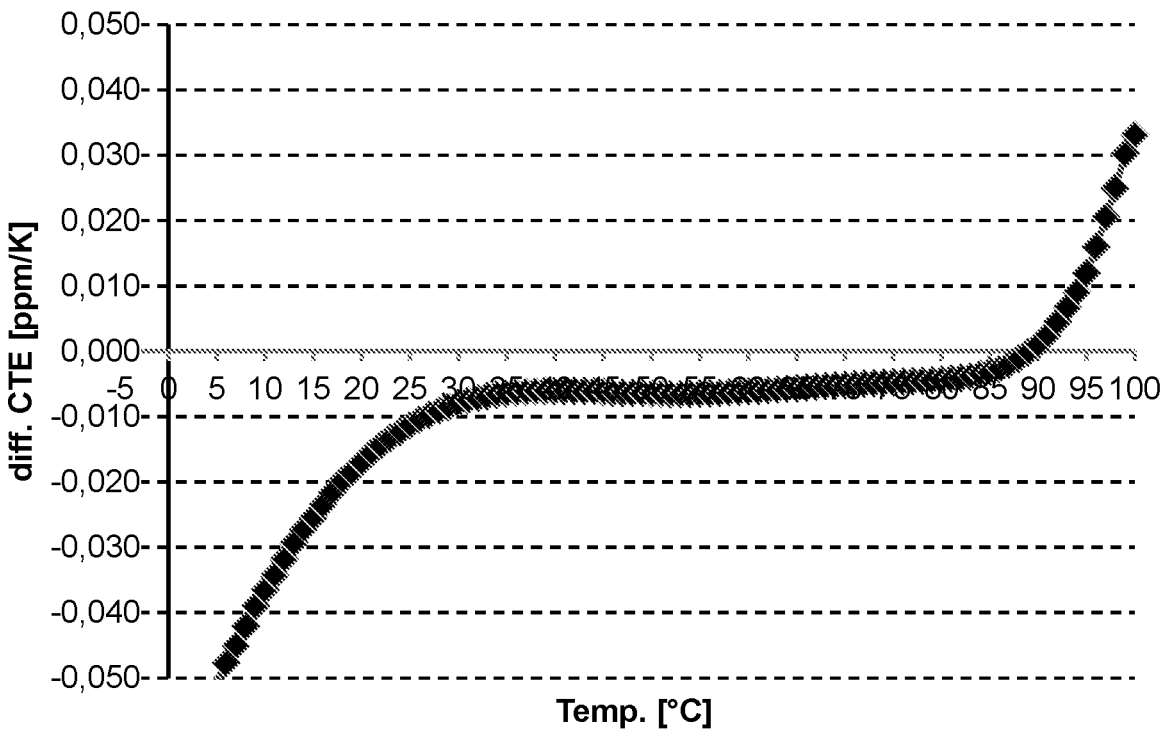
Figure 7:
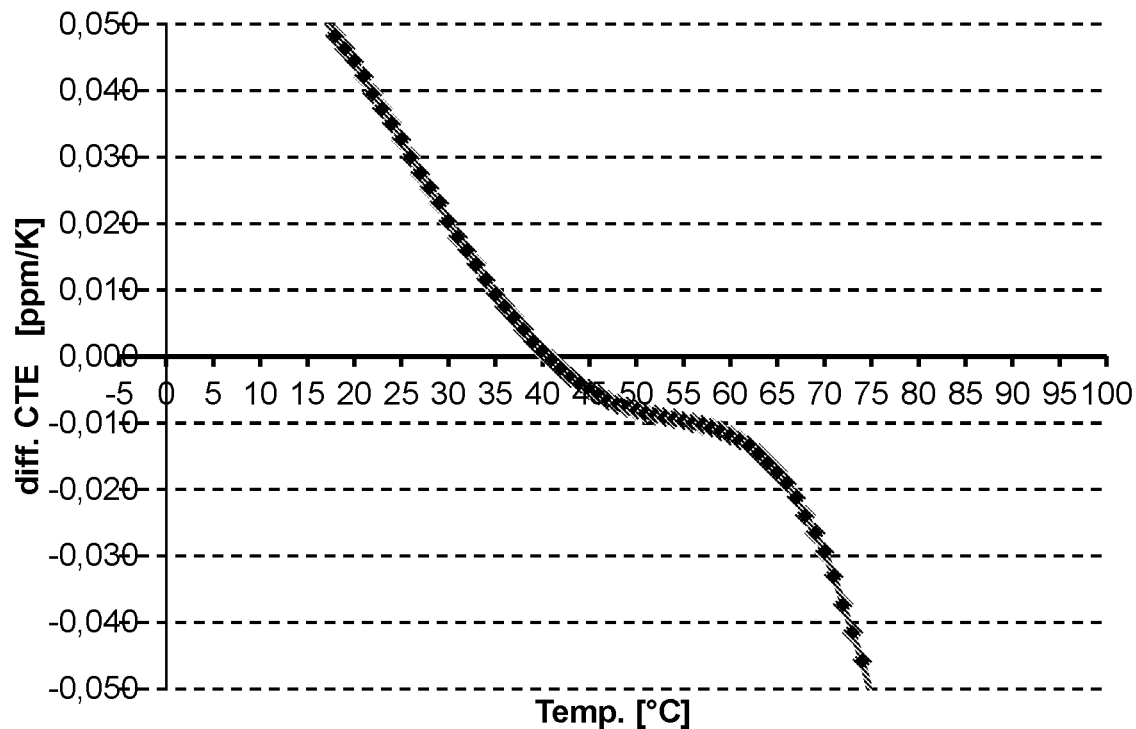
FIGS. 7 and 8 show CTE-T curves of glass-ceramics without a broad CTE plateau, although the glass-ceramic in FIG. 7 has a zero crossing of the CTE-T curve at more than 40° C.
Figure 8:
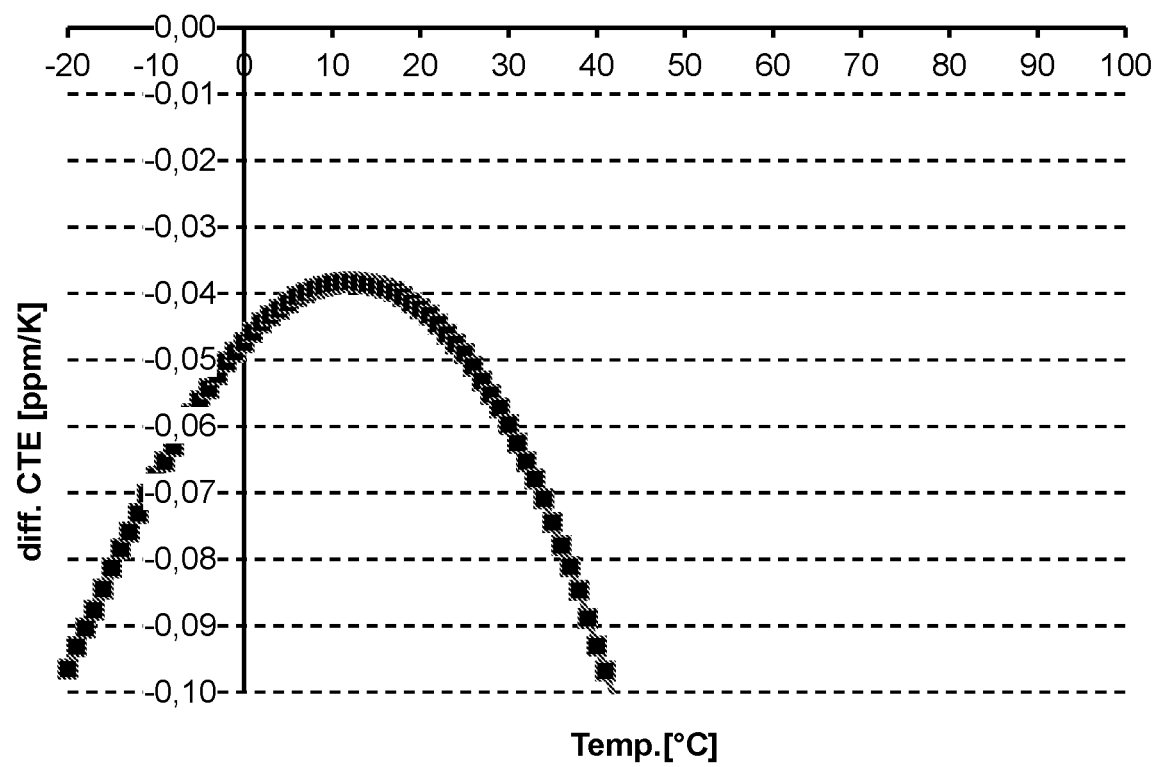

To produce a $\Delta I/I_0$-T curve or an expansion curve, or to plot the change in length, $\Delta I/I_0$, of a test specimen against the temperature, it is possible to measure the temperature-dependent change in the length of a test specimen from the original length $I_0$ at the initial temperature $t_0$ to the length $I_t$ at the temperature t. In this case preferably small temperature intervals of, for example, 5° C. or 3° C. are selected for determining a measurement point. Such measurements may be carried out, for example, by dilatometric methods, interferometric methods, for example the method of Fabry-Perot, i.e. the evaluation of the shift in the resonance peak of a laser beam coupled into the material, or by other suitable methods. The method selected for determining the $\Delta I/I_0$-T measurement points preferably has an accuracy of preferably at least ±0.10 ppm, more preferably of at least ±0.05 ppm, most preferably of at least ±0.01 ppm, and according to certain embodiments even ±0.005 ppm. FIG. 3 shows a $\Delta I/I_0$-T curve for a precision component of the invention.

A CTE-T curve is obtained by the derivation of the $\Delta I/I_0$-T curve. From the CTE-T curve it is possible to determine the zero crossing, the gradient of the CTE-T curve, and also the average thermal expansion within a temperature interval.

Surprisingly it was found that precision components having a CTE plateau can be produced. A CTE plateau refers to a range, extending over a section of the CTE-T curve, within which the differential CTE does not exceed a value of 0±0.015 ppm/K, more preferably 0±0.010 ppm/K, most preferably 0±0.005 ppm/K, i.e. a CTE of close to 0 ppb/K. The temperature interval of the CTE plateau is identified as $T_P$.

It may be advantageous if the temperature interval $T_P$ is in a range from −10 to +100° C., preferably 0 to 80° C.

The position of the CTE plateau is preferably adapted to the application temperature of the precision component. Preferred application temperatures lie in the −60° C. to +100° C. range, more preferably from −40° C. to +80° C. Particular variants of the present invention relate to precision components for application temperatures $T_A$ of 22° C., 40° C., 60° C., 80° C. and 100° C. The CTE plateau, i.e. the curve region with the small deviation in the differential CTE in the temperature interval $T_P$, may also be situated in the temperature range of [−10; 100° C.]; [0; 80° C.], [0; 30° C.], [10; 40° C.], [20; 50° C.], [30; 60° C.], [40; 70° C.] and/or [50; 80° C.].

According to one variant of the invention, the CTE-T curve additionally has at least one curve section with a low gradient in a temperature interval having at least a width of 30 K, preferably 40 K, more preferably 50 K, more particularly a gradient of at most $\pm 10 \times 10^{-4}$ ppm/K$^2$, i.e. ±1 ppb/K$^2$, preferably at most $\pm 8 \times 10^{-4}$ ppm/K$^2$, and even, according to specific variants, only at most $\pm 5 \times 10^{-4}$ ppm/K$^2$.

According to a further variant, a precision component is provided whose CTE-T curve at a temperature of at least 40° C., preferably at least 45° C., more preferably at least 50° C., and according to one variant at least 60° C., has at least a value of the CTE of at most 0±0.020 ppm/K, preferably at most 0±0.010 ppm/K, more preferably at most 0±0.005 ppm/K. In accordance with this variant of the invention, furthermore, the CTE-T curve may also have one or more zero crossings.

The precision component of the invention preferably has a high total spatial variation of CTE. The value of the total spatial variation of CTE (also referred to as "CTE homogeneity", German: "CTE Homogenitaet") refers to the peak-to-valley value, i.e. the difference between, respectively, the highest and lowest CTE values of the samples taken. In accordance with the invention, the figure is reported in ppb/K, where 1 ppb/K=0.001×10$^{-6}$/K. The total spatial variation of CTE over the precision component as a whole is at most 5 ppb/K, preferably at most 4 ppb/K, most preferably at most 3 ppb/K.

The precision component preferably comprises an inorganic material selected from the group consisting of doped fused silica, glass-ceramic and ceramic, preferably Ti-doped fused silica, LAS glass-ceramic and cordierite.

One embodiment relates to precision components having relatively small dimensions, more particularly edge lengths (width and/or depth) in the case of (rect)angular forms or diameters, in the case of circular areas, of at least 100 mm and/or less than 500 mm and/or a thickness of less than 50 mm, preferably less than 10 mm and/or at least 1 mm, more preferably at least 2 mm. Precision components of this kind may be employed, for example, in microlithography.

It is also possible, however, to produce very large precision components. One embodiment of the invention therefore relates to components of high volume. For the purposes of this specification, this is intended to refer to a component having a mass of at least 500 kg, preferably at least 1 t, more preferably at least 2 t, and according to one variant of the invention at least 5 t, and/or having edge lengths (width and/or depth), in the case of (rect)angular forms, of at least 0.5 m, more preferably at least 1 m, and a thickness (height) of at least 50 mm, preferably 100 mm, or, in the case of circular forms, having a diameter of at least 0.5 m, more preferably at least 1 m, more preferably at least 1.5 m, and/or having a thickness (height) of at least 50 mm, preferably 100 mm. In the case of specific embodiments of the invention, the components may be even larger, having, for example, a diameter of at least 3 m or at least 4 m or greater. According to one variant, the invention also relates to rectangular components, where preferably at least one surface has an area of at least 1 m², preferably at least 1.2 m², more preferably at least 1.4 m². Produced in general are high-volume components which have a significantly larger base area than height. The process of the invention is also suitable, however, for producing high-volume components having a form approximate to a cube or to a sphere. Such a component may be described not only by the volume and the weight but also by a form factor R=h/d. Here, h corresponds to the height of the component, and d to the diameter. The form factor R=h/d here is defined as the ratio of height h to transverse extent d, with the transverse extent d being the diameter of a cylindrical form and the diagonal of a cuboidal form. Whereas, in the production of certain large-volume components, such as lenses or telescope mirrors, for instance, the form factors are generally below 0.1, there is also a requirement for large-volume components whose form factors are above 0.1, in the range between 0.1 and 0.3, for instance, an example being prisms. A further embodiment of the present invention therefore relates to large-volume components having high form factors, which may be between about 0.1 and 0.3, up to a maximum of about 0.5.

The precision components of the invention are very advantageous, since now a component not only can be optimized for the subsequent application temperature, but also has a low thermal expansion when subject, for example, to higher temperature loads, such as during production, for example. Precision components for microlithography and metrology are customarily used under standard clean-room conditions, more particularly at an ambient temperature of 22° C. The CTE may be adapted to this application temperature. However, such components are subjected to various process steps, such as to coating with metallic layers, for example, and to cleaning, patterning and/or exposure operations, in which the temperatures present may be higher than those prevailing during subsequent use in the clean room. The precision components of the invention, which have a CTE plateau and hence an optimized zero expansion not only at application temperature but also at possibly higher temperatures during production, are therefore very advantageous.

Precision components may be, for example, optical components, and specifically a normal incidence mirror, i.e. a mirror which is operated close to perpendicular radiation incidence, or a grazing incidence mirror, i.e. a mirror which is operated with grazing radiation incidence. Such a mirror comprises the substrate and also a coating which reflects the incident radiation. In the case of a mirror for X-radiation, in particular, the reflective coating is for example a multi-layer system or multilayer having a multiplicity of layers of high reflectivity for non-grazing incidence in the X-ray range. A multi-layer system of this kind for a normal incidence mirror preferably comprises 40 to 200 layer pairs, consisting of alternate layers of one of the material pairings Mo/Si, Mo/Bi and/or MoRu/Be.

The optical elements of the invention may in particular be X-ray-optical elements, i.e. optical elements which are used in conjunction with X-radiation, more particularly soft X-radiation or EUV radiation, and more particularly may be photomasks or reticle masks operated in reflection, especially for EUV (extreme UV) microlithography. With further advantage the precision component can be used as a mirror for EUV lithography.

Furthermore, the precision component of the invention may be a component, more particularly a mirror, for astronomical applications. In that case such components for astronomical application may be used both terrestrially and in space.

The component according to the invention may be a lightweight structure. The component according to the invention may further comprise a lightweight structure. This means that in certain regions of the component, cavities are provided for weight reduction. The weight of a component is preferably reduced, by processing for light weight, by at least 80%, more preferably at least 90%, by comparison with the unprocessed component.

The invention also relates, furthermore, to the use and a method of using of the precision component according to the invention for metrology, spectroscopy and in astronomy, for example as mirror supports for segmented or monolithic astronomic telescopes or else lightweight or ultralight mirror substrates for, for example, space-based telescopes or optics for observation of the Earth, as precision components, such as standards for precision measurement technology, mechanical precision parts, e.g. for ring laser gyroscopes, spiral springs for the horological industry, in LCD lithography, for example as mirrors and prisms, and also in microlithography, for example as mask holders, wafer tables and reference plates, grid plates.

The invention relates further to a glass-ceramic which can be used for producing the precision component according to the invention or to a corresponding method of using.

The invention further relates to an astronomic mirror comprising a precision component according to the invention.

The invention also relates to a stepper for LCD lithography or for microlithography comprising a precision component according to the invention.

The invention also relates to a ring laser gyroscope comprising a precision component according to the invention.

A glass-ceramic in accordance with the invention refers to inorganic, non-porous materials having a crystalline phase and a vitreous phase, with the matrix—i.e. the continuous phase—generally being a glass phase. To produce the glass-ceramic, the components of the glass-ceramic are first of all mixed, melted and refined, and a so-called green glass is cast. The green glass, after cooling, is subjected to control crystallization by reheating. The chemical composition (analysis) of the green glass is the same as that of the glass-ceramic produced from it; ceramization alters only the internal structure of the material. Consequently, in any reference below to the composition of the glass-ceramic, the statement made is equally valid for the precursor of the glass-ceramic, i.e. for the green glass.

The glass-ceramic is an LAS (Lithium-Aluminium-Silicate) glass-ceramic which comprises at least the components $SiO_2$, $Al_2O_3$, $P_2O_5$, ZnO, MgO, $Li_2O$ and $TiO_2$.

The glass-ceramic comprises the following composition (in mol % based on oxide):

| | |
|---|---|
| $SiO_2$ | 55-75 |
| $Al_2O_3$ | 10-25 |
| $P_2O_5$ | 1-10 |
| $TiO_2$ | >0 |
| $ZrO_2$ | 0-5 |
| $TiO_2 + ZrO_2$ | ≥2.0 |
| $Li_2O$ | 1-15 |
| $Na_2O$ | 0-2 |
| $K_2O$ | 0-2 |
| MgO | 0.1-5 |
| CaO | 0-5 |

-continued

| | |
|---|---|
| BaO | 0-5 |
| SrO | 0-5 |
| ZnO | >0-5 |

It was surprisingly found that in the vicinity of compositions that are already customary, there are specific new composition ranges for LAS glass-ceramics in which, in contrast to the glass-ceramics already known, it is possible to form a CTE plateau.

The glass-ceramic preferably comprises a fraction of silicon dioxide ($SiO_2$) of at least 55 mol %, more preferably at least 60 mol %, also preferably at least 61 mol %, also preferably at least 61.75 mol %, further preferably at least 62.0 mol %. The fraction of $SiO_2$ is preferably at most 75 mol %, more preferably at most 70 mol %, with further preference at most 66.0 mol %. At higher fractions of $SiO_2$ the batch is more difficult to melt; smaller amounts may be preferred for this reason. In the case of variants with an $Al_2O_3$ content of less than 17.0 mol %, a fraction of at most 65.5 mol %, preferably 65.25 mol %, possibly even at most 65.0 mol %, may be preferred as an upper limit for $SiO_2$, and/or, as a more preferred lower limit, at least 63.5 mol %, also preferably at least 63.75 mol %, with further preference at least 64.0 mol % may be appropriate. In the case of variants with an $Al_2O_3$ content of at least 17.0 mol %, a preferred lower limit for $SiO_2$ may be at least 62.0 mol %, preferably more than 62.0 mol %. Some advantageous variants may also include at least 62.25 mol %. In the case of variants with an $Al_2O_3$ content of at least 17.0 mol %, a preferred upper limit for $SiO_2$ may be 65.75 mol %.

The fraction of $Al_2O_3$ is preferably at least 10 mol %, more preferably at least 15 mol %, also preferably at least 15.8 mol %, also preferably at least 16.0 mol %, with further preference at least 16.1 mol %, and also preferably more than 16.1 mol %. The fraction of $Al_2O_3$ is preferably at most 25 mol %, more preferably at most 20 mol %, with further preference at most 19.0 mol %.

In accordance with the invention it was found that a particular ratio of $SiO_2$ to $Al_2O_3$, i.e. of the components which form the high-quartz solid solution, may be beneficial to the formation of a CTE plateau. Preferred compositional ranges may be defined by the equation (molar amount of $SiO_2$−(m×molar amount of $Al_2O_3$))=d, where m describes the gradient of a straight line and d describes a constant term. According to a variant A, based on compositions having an $Al_2O_3$ fraction of at least 17.0 mol %, limits of a preferred range may be described by straight lines having a gradient $m_1 = -4.6$ and a term $d_1$ of at least 142.5 and/or preferably at most 149.0. A limit of a preferred range may be described according to variant B by a straight line having a gradient $m_3 = -2.0$ and a term $d_3$ of preferably less than 101.0, more preferably at most 100.5. According to a variant C with an $Al_2O_3$ fraction of less than 17.0 mol %, limits of a preferred compositional range may be described by straight lines having a gradient $m_2 = 2.0$ and a term $d_2$ of preferably at most 34.0 and/or preferably at least 30.7. In the case of variant C, $d_2$ could also be at most 32.0.

Glass-ceramics which fall into variant A are particularly suitable if a plateau at relatively high temperatures is desired. Depending on application, however, a glass-ceramic with differently formed CTE plateaus may also be preferred.

Variants A to C may be combined arbitrarily with the aforementioned upper and lower limits for $SiO_2$ and $Al_2O_3$, unless otherwise defined in the case of the particular variant.

Specifically, a first variant of the invention relates to glass-ceramics having an $Al_2O_3$ content of less than 17.0 mol %, in which one or more of the following conditions are met:

the $Al_2O_3$ content is preferably at least 15.0 mol %, more preferably at least 15.8 mol %, more preferably at least 16.0 mol %, preferably at least 16.1 mol %, more preferably more than 16.1 mol %, and the $SiO_2$ content is preferably at least 63.5 mol %, more preferably at least 63.75 mol %, more preferably at least 64.0 mol %, and/or preferably at most 65.6 mol %, more preferably at most 65.0 mol % and the condition applies that 30.7≤(molar amount of $SiO_2$−(2.0× molar amount of $Al_2O_3$)), advantageously 30.9≤(molar amount of $SiO_2$−(2.0× molar amount of $Al_2O_3$)), preferably 31.0≤(molar amount of $SiO_2$−(2.0× molar amount of $Al_2O_3$)).

Advantageously the condition that (molar amount of $SiO_2$−(2.0× molar amount of $Al_2O_3$))≤34.0 may apply.

Further variants of the invention relate to glass-ceramics having an $Al_2O_3$≥17.0 mol %, in which one or more of the following conditions are met:

the $Al_2O_3$ content is preferably at most 19.5 mol %, more preferably at most 19.0 mol % and the $SiO_2$ content is preferably at least 62.0 mol %, preferably more than 62.0 mol %, and/or preferably at most 66.0 mol %, and it is the case that 142.5≤(molar amount of $SiO_2$+(4.6× molar amount of $Al_2O_3$)), advantageously 143.0≤(molar amount of $SiO_2$+(4.6× molar amount of $Al_2O_3$)), preferably 143.0<(molar amount of $SiO_2$+(4.6× molar amount of $Al_2O_3$)), and one of the following conditions applies:

(molar amount of $SiO_2$+(4.6× molar amount of $Al_2O_3$))≤149.0, or (molar amount of $SiO_2$+(2.0× molar amount of $Al_2O_3$))≤101.0, preferably≤100.5.

The glass-ceramic always contains $P_2O_5$. The phosphate content $P_2O_5$ of the glass-ceramic is preferably at least 1 mol %, more preferably at least 2 mol %, and/or at most 10 mol %, more preferably at most 8 mol %, according to one variant at most 5 mol %, with further preference at most 4 mol %.

The sum total fraction in mol % of the basic constituents of the LAS glass-ceramic, $SiO_2$ and $Al_2O_3$, is preferably at least 75 mol %, more preferably at least 78 mol % and/or preferably at most 85 mol %.

The sum total fraction in mol % of the basic constituents of the LAS glass-ceramic, $SiO_2$, $Al_2O_3$ and $P_2O_5$, is preferably at least 70 mol %, advantageously at least 75 mol %, more preferably at least 78 mol %, also preferably at least 80 mol %, and/or preferably at most 95 mol %, more preferably at most 90 mol %, according to one variant at most 89 mol %.

The glass-ceramic further comprises titanium oxide ($TiO_2$). It contains $TiO_2$ in a fraction of preferably at least 0.5 mol %, preferably at least 1.0 mol % and/or preferably at most 5 mol %, more preferably at most 3 mol %, with further preference at most 2.0 mol %.

The glass-ceramic may further comprise zirconium oxide ($ZrO_2$) in a fraction of at most 5 mol %, preferably at most 3 mol %, more preferably at most 2 mol %. $ZrO_2$ is included preferably in a fraction of at least 0.1 mol %, more preferably at least 0.5 mol %, at least 0.6 mol %. $ZrO_2$-free variants are possible.

The sum total of the fractions of the nucleating agents $TiO_2$ and $ZrO_2$ is preferably at least 2 mol %, more preferably more than 2 mol %, more preferably at least 2.5 mol %, according to certain variants at least 3.0 mol %. An advantageous upper limit may be 10 mol %, preferably 8 mol %, more preferably 5 mol % or 4 mol %.

As a further constituent the glass-ceramic comprises lithium oxide ($Li_2O$), preferably in a fraction of at least 1 mol %, preferably at least 5 mol %, very preferably at least 7 mol %. The fraction of $Li_2O$ is limited to preferably at most 15 mol %, more preferably at most 12 mol %, with further preference at most 10 mol %.

Sodium oxide ($Na_2O$) and/or potassium oxide ($K_2O$) are present optionally in the glass-ceramic, i.e. $Na_2O$-free and/or $K_2O$-free variants are possible. The fraction of $Na_2O$ and/or $K_2O$, in each case and independently of one another, may be at most 2 mol %, preferably at most 1 mol %, most preferably at most 0.5 mol %. $Na_2O$ and $K_2O$ may each be included, independently of one another, in a fraction of at least 0.01 mol %, preferably at least 0.02 mol %, more preferably at least 0.05 mol %, in the glass-ceramic.

The glass-ceramic further comprise magnesium oxide (MgO). It contains MgO preferably in a fraction of preferably at least 0.1 mol %, more preferably at least 0.5 mol %, according to one variant at least 1.0 wt %, and/or at most 5 mol %, preferably at most 3 mol %, according to one variant at most 2 mol %.

As a further component the glass-ceramic comprises zinc oxide (ZnO). This component is included in a fraction of preferably at least 0.1 mol %, more preferably at least 0.5 mol % and according to one variant of the invention in a fraction of at least 1.0 mol %. The fraction of ZnO is preferably limited to at most 5 mol %, more advantageously to at most 4 mol %, according to one variant to at most 3 mol %. Some variants may have at most 2 mol % of ZnO.

The sum total fraction in mol % of the components MgO and ZnO is preferably at least 1.8 mol %, more preferably at least 2.0 mol % and/or preferably at most 10 mol %, more preferably at most 5 mol %.

According to some variants of the invention, the sum total fraction in mol % of the components MgO and ZnO and $Li_2O$ is preferably at least 10.0 mol %, according to certain variants advantageously at least 11.0 mol %, more preferably at least 11.2 mol %, with further preference at least 11.5 mol %. In the case of a glass-ceramic with an $Al_2O_3$<17.0 mol % it may be advantageous if the sum total fraction in mol % of the components MgO and ZnO and $Li_2O$ is at least 10.0 mol %, preferably at least 10.4 mol %. In the case of a glass-ceramic with an $Al_2O_3 \propto 17.0$ mol % it may be advantageous if the sum total fraction in mol % of the components MgO and ZnO and $Li_2O$ is at least 11.0 mol %, preferably more than 11.0 mol %, more preferably at least 11.2 mol %, also preferably at least 11.5 mol %. Both for a glass-ceramic having an $Al_2O_3$<17.0 mol % and for a glass-ceramic having an $Al_2O_3 \geq 17.0$ mol %, an advantageous upper limit may be 25 mol %, preferably 20 mol %, more preferably 15 mol %. In the case of particular variants, 13 mol % as well may be a favourable upper limit.

The glass-ceramic may comprise further alkaline earth metal oxides, such as CaO, BaO and/or SrO. The fraction of CaO is preferably at most 5 mol %, more preferably at most 3 mol %, more preferably at most 2 mol %. The glass-ceramic may contain at least 0.1 mol %, preferably at least 0.5 mol %, of CaO. The glass-ceramic may contain BaO in a fraction of at least 0.1 mol %, preferably at least 0.5 mol %, and/or at most 5 mol %, preferably at most 3 mol %, more preferably at most 2 mol %. The glass-ceramics may contain SrO in a fraction of at most 5 mol %, preferably at most 4 mol %, more preferably at most 3 mol % and/or preferably at least 0.1 mol %. According to individual embodiments, the glass-ceramics are free of CaO, BaO and/or SrO.

The glass-ceramic may further comprise one or more customary refining agents, selected from the group consisting of $As_2O_3$, $Sb_2O_3$, SnO, $SO_4^{2-}$, $F^-$, $Cl^-$, $Br^-$, or a mixture thereof, in a fraction of at least 0.1 mol % and/or at most 1 mol %.

The main crystal phase of the glass-ceramics of the invention comprises high-quartz solid solution. These glass-ceramics typically comprise, as main crystal phase, about 50% to 80% of solid solutions containing high-quartz, which are also called β-eucryptite solid solutions. This crystallization product is a metastable phase which, depending on the crystallization conditions, changes its composition and/or structure, or is transformed into a different crystal phase. The solid solutions containing high-quartz have a very low thermal expansion or even a thermal expansions which falls as the temperature goes up.

In accordance with the invention, the expression "X-free" or "free from a component X" means that the glass-ceramic essentially does not contain this component X, in other words that such a component is present at most as an impurity in the glass, but is not added as an individual component to the composition. X here stands for any component, such as SrO, for example.

According to one embodiment of the present invention, a transparent glass-ceramic is used. Because of the transparency it is possible to make a better assessment of many properties of such a glass-ceramic, and in particular, of course, its internal quality. The glass-ceramics of the invention are transparent, meaning that they have an internal transmission of at least 70% in the wavelength range from 350 to 650 nm.

It will be appreciated that the features of the invention identified above, and those still to be elucidated below, can be used not only in the particular combination indicated but also in other combinations, without departing from the scope of the invention.

The entire disclosures of all applications, patents and publications, cited above and below, and of corresponding German application 10 2017 208 907.5 filed May 26, 2017, are hereby incorporated by reference.

The present invention will be illustrated below by a series of examples. However, the present invention is not limited to the examples mentioned.

EXAMPLES

Production of the glass-ceramic is described in WO 2015/124710 A1, for example. Tables 1 and 2 show compositions of inventive glass-ceramics and comparative examples, and also their properties.

TABLE 1

Compositions, ceramization and properties (mol %)

| $Al_2O_3$ <17 mol % | Example number | | | | |
|---|---|---|---|---|---|
| | 1 | 2 | 3 | 4 | 5 |
| $Li_2O$ | 8.5 | 8.3 | 8.5 | 7.9 | 8.2 |
| $Na_2O$ | 0.2 | 0.1 | 0.2 | 0.5 | 0.6 |

TABLE 1-continued

Compositions, ceramization and properties (mol %)

| | | | | | |
|---|---|---|---|---|---|
| $K_2O$ | 0.4 | | 0.4 | 0.2 | 0.2 |
| MgO | 1.9 | 1.2 | 1.7 | 1.1 | 0.9 |
| ZnO | 1.3 | 1.3 | 1.4 | 1.5 | 1.3 |
| CaO | | 1.8 | | 0.8 | 1.3 |
| BaO | | | | 0.6 | 0.5 |
| $Al_2O_3$ | 16.4 | 16.6 | 16.9 | 16.5 | 16.4 |
| $SiO_2$ | 64.3 | 64.1 | 64.9 | 64.8 | 64.7 |
| $P_2O_5$ | 3.9 | 3.5 | 2.8 | 3.1 | 2.9 |
| $TiO_2$ | 1.9 | 2.0 | 1.9 | 2.0 | 1.8 |
| $ZrO_2$ | 1.1 | 1.1 | 1.0 | 1.0 | 1.0 |
| $As_2O_3$ | 0.2 | 0.1 | 0.2 | 0.2 | 0.2 |
| Total | 100.1 | 100.1 | 99.9 | 100.2 | 100.0 |
| $SiO_2 + Al_2O_3 + P_2O_5$ | 84.6 | 84.2 | 84.6 | 84.4 | 84.0 |
| $SiO_2 - (2 \times Al_2O_3)$ | 31.5 | 30.9 | 31.1 | 31.8 | 31.9 |
| Temperature [° C.] | 790 | 795 | 810 | 800 | 770 |
| Duration [days] | 5 | 5 | 10 | 5 | 5 |
| CTE(0; +50° C.) [ppm/K] | 0.003 | −0.008 | 0.005 | −0.002 | −0.006 |
| Zero crossing CTE [° C.] | 5 | −4 | 6 | 7 | |
| Zero crossing CTE [° C.] Plateau position [° C.] | 48 | 18 | 53 | 26 | |
| 0 ± 0.015 ppm/K | [−4; +57] | [11; 37] | [−1; +60] | [−2; +55] | [+2; +55] |
| 0 ± 0.01 ppm/K | [−1; +54] | [−9; 31] | [+1; 58] | [0; +50] | [+5; +51] |
| 0 ± 0.005 ppm/K | [1; 52] | | [+3; 13] | [+3; +40] | [+11; +45] |
| 0 ± 0.005 ppm/K | | | [48; 56] | | |
| 15 ppb plateau width | 61K | 48K | 61K | 57K | 53K |
| 10 ppb plateau width | 55K | 40K | 57K | 50K | 46K |
| 5 ppb plateau width | 51K | | 10/6K | 37K | 34K |

| | Comparative Example No. | | | | | |
|---|---|---|---|---|---|---|
| $Al_2O_3$ <17 mol % | 1 | 2 | 3 | 4 | 5 | 6 |
| $Li_2O$ | 9.2 | 8.3 | 8.9 | 8.7 | 8.7 | 8.5 |
| $Na_2O$ | 0.1 | 0.1 | 0.1 | 0.2 | 0.2 | |
| $K_2O$ | | 0.4 | | | 0.4 | 0.4 |
| MgO | 1.6 | 1.8 | 1.3 | 2.2 | 1.8 | 1.9 |
| ZnO | 0.6 | 1.4 | 0.5 | 0.9 | 1.4 | 1.2 |
| CaO | 1.2 | | 1.3 | 1.5 | | |
| BaO | 0.4 | | 0.3 | 0.5 | | |
| $Al_2O_3$ | 16.2 | 15.7 | 16.1 | 16.2 | 17.0 | 16.9 |
| $SiO_2$ | 63.3 | 65.4 | 64.6 | 62.7 | 63.5 | 64.4 |
| $P_2O_5$ | 3.8 | 3.7 | 3.8 | 4.0 | 3.9 | 3.5 |
| $TiO_2$ | 2.2 | 1.9 | 2.0 | 1.8 | 2.0 | 1.9 |
| $ZrO_2$ | 1.1 | 1.0 | 1.1 | 1.1 | 1.1 | 1.1 |
| $As_2O_3$ | 0.2 | 0.2 | 0.2 | 0.1 | 0.2 | 0.2 |
| Total | 99.9 | 99.9 | 100.2 | 99.9 | 100.2 | 100.0 |
| $SiO_2 + Al_2O_3 + P_2O_5$ | 83.3 | 84.8 | 84.5 | 82.9 | 84.4 | 84.8 |
| $SiO_2 - (2 \times Al_2O_3)$ | 30.9 | 34.0 | 32.4 | 30.3 | 29.5 | 30.6 |
| Temperature [° C.] | 770 | 780 | 760 | 770 | 810 | 810 |
| Duration [days] | 5 | 5 | 5 | 5 | 7.5 | 4.5 |
| CTE(0; +50° C.) [ppm/K] | −0.060 | 0.010 | 0.040 | 0.070 | −0.030 | −0.02 |
| Zero crossing CTE [° C.] | | | | | | |
| Zero crossing CTE [° C.] Plateau position [° C.] | | | | | | |
| 0 ± 0.015 ppm/K | | | | | | |
| 0 ± 0.01 ppm/K | | | | | | |
| 0 ± 0.005 ppm/K | | | | | | |
| 0 ± 0.005 ppm/K | | | | | | |
| 15 ppb plateau width | | | | | | |
| 10 ppb plateau width | | | | | | |

TABLE 2

Compositions, ceramization and properties (mol %)

| | Example No. | | | | | |
|---|---|---|---|---|---|---|
| $Al_2O_3$ ≥17 mol % | 6 | 7 | 8 | 9 | 10 | 11 |
| $Li_2O$ | 8.6 | 8.6 | 8.7 | 8.5 | 9.0 | 8.7 |
| $Na_2O$ | 0.1 | 0.2 | 0.1 | 0.2 | 0.2 | 0.2 |

TABLE 2-continued

Compositions, ceramization and properties (mol %)

|  |  |  |  |  |  |  |
|---|---|---|---|---|---|---|
| $K_2O$ | 0.4 | 0.4 | 0.4 | 0.4 | 0.5 | 0.4 |
| MgO | 1.8 | 1.8 | 1.8 | 1.8 | 1.9 | 1.8 |
| ZnO | 1.1 | 1.3 | 1.3 | 1.4 | 1.4 | 1.2 |
| $Al_2O_3$ | 18.3 | 18.1 | 17.2 | 17.6 | 18.0 | 18.5 |
| $SiO_2$ | 63.7 | 64.1 | 63.5 | 62.4 | 62.5 | 62.7 |
| $P_2O_5$ | 2.9 | 2.5 | 3.8 | 4.4 | 3.4 | 3.3 |
| $TiO_2$ | 2.0 | 1.9 | 2.0 | 2.0 | 1.9 | 2.0 |
| $ZrO_2$ | 1.1 | 1.1 | 1.1 | 1.1 | 1.1 | 1.1 |
| $As_2O_3$ | 0.1 | 0.1 | 0.2 | 0.1 | 0.2 | 0.1 |
| Total | 100.1 | 100.1 | 100.1 | 99.9 | 100.1 | 100.0 |
| $SiO_2 + Al_2O_3 + P_2O_5$ | 84.9 | 84.7 | 84.5 | 84.4 | 83.9 | 84.5 |
| $SiO_2 + (4.6 \times Al_2O_3)$ | 147.9 | 147.4 | 142.6 | 143.4 | 145.3 | 147.8 |
| Temperature [° C.] | 800 | 800 | 805 | 790 | 805 | 800 |
| Duration [days] | 5 | 5 | 5 | 5 | 5 | 5 |
| CTE(0; +50° C.) [ppm/K] | 0.000 | −0.020 | −0.006 | −0.003 | −0.010 | 0.005 |
| Zero crossing CTE [° C.] | 18 |  |  | 12 | 24 |  |
| Zero crossing CTE [° C.] | 71 |  |  | 29 | 56 |  |
| Zero crossing CTE [° C.] | 94 | 89 |  |  | 95 | 80 |
| Plateau position [° C.] |  |  |  |  |  |  |
| 0 ± 0.015 ppm/K | [>10] | [21; 96] | [+2; 49] | [−1; +49] | [14; >100] | [64; >100] |
| 0 ± 0.01 ppm/K | [>55] | [26; 95] | [+5; 47] | [2; 46] | [+17; 69] |  |
| 0 ± 0.005 ppm/K | [>64] | [72; 92] |  | [5; 41] |  |  |
| 15 ppb plateau width | >85K | 75K | 47K | 50K | >90K |  |
| 10 ppb plateau width | >45K | 70K | 42K | 44K | 52K |  |
| 5 ppb plateau width | >36K | 20K |  | 36K |  |  |

|  | Example No. | | | | | | |
|---|---|---|---|---|---|---|---|
| $Al_2O_3 \geq 17$ mol % | 12 | 13 | 14 | 15 | 16 | 17 | 18 |
| $Li_2O$ | 8.7 | 8.6 | 8.0 | 8.4 | 8.6 | 8.5 | 8.7 |
| $Na_2O$ | 0.2 | 0.2 | 0.2 | 0.2 | 0.1 | 0.2 | 0.2 |
| $K_2O$ | 0.5 | 0.4 | 0.4 | 0.4 | 0.4 | 0.4 | 0.4 |
| MgO | 1.9 | 1.9 | 2.2 | 1.8 | 1.9 | 1.8 | 1.9 |
| ZnO | 1.1 | 1.0 | 1.4 | 1.2 | 1.2 | 1.3 | 1.3 |
| $Al_2O_3$ | 17.5 | 18.8 | 17.1 | 17.2 | 17.6 | 17.6 | 18.1 |
| $SiO_2$ | 63.5 | 62.3 | 64.2 | 65.7 | 64.1 | 65.1 | 62.4 |
| $P_2O_5$ | 3.5 | 3.5 | 3.4 | 2.0 | 3.0 | 2.0 | 3.8 |
| $TiO_2$ | 2.0 | 2.0 | 2.0 | 1.9 | 1.9 | 1.9 | 2.0 |
| $ZrO_2$ | 1.1 | 1.1 | 1.0 | 1.1 | 1.1 | 1.1 | 1.1 |
| $As_2O_3$ | 0.2 | 0.2 | 0.1 | 0.1 | 0.1 | 0.1 | 0.2 |
| Total | 100.2 | 100.0 | 100.0 | 100.0 | 100.0 | 100.0 | 100.1 |
| $SiO_2 + Al_2O_3 + P_2O_5$ | 84.5 | 84.6 | 84.7 | 84.9 | 84.7 | 84.7 | 84.3 |
| $SiO_2 + (4.6 \times Al_2O_3)$ | 144.0 | 148.8 | 142.9 | 144.8 | 145.1 | 146.1 | 145.7 |
| Temperature [° C.] | 800 | 785 | 765 | 830 | 810 | 810 | 800 |
| Duration [days] | 10 | 5 | 5 | 6.5 | 5 | 8.5 | 5 |
| CTE(0; +50° C.) [ppm/K] | 0.000 | −0.02 | 0.004 | −0.014 | 0.010 | −0.016 | 0.000 |
| Zero crossing CTE [° C.] |  |  |  | 22 | 12 | 75 | 15 |
| Zero crossing CTE [° C.] |  |  |  | 66 |  |  | 57 |
| Zero crossing CTE [° C.] |  |  |  |  | 85 |  |  |
| Plateau position [° C.] |  |  |  |  |  |  |  |
| 0 ± 0.015 ppm/K | [3; 86] | [18; 61] |  | [15; 63] | [57; 97] | [18; 90] | [7; 71] |
| 0 ± 0.01 ppm/K | [53; 65] | [21; 55] | ab 54° C. | [18; 52] | [71; 92] | [21; 84] | [11; 67] |
| 0 ± 0.005 ppm/K | [8; 62] | [26; 48] |  |  | [79; 89] |  | [45; 63] |
| 15 ppb plateau width |  | 43K |  | 48K | 40K | 72K | 64K |

TABLE 2-continued

| Compositions, ceramization and properties (mol %) | | | | | | |
|---|---|---|---|---|---|---|
| 10 ppb plateau width | 62K | 34K | >55K | 34K | 63K | 56K |
| 5 ppb plateau width | 54K | 22K | | | | |

| | Comparative Example No. | | | | |
|---|---|---|---|---|---|
| $Al_2O_3 \geq 17$ mol % | 7 | 8 | 9 | 10 | 11 |
| $Li_2O$ | 8.6 | 8.5 | 9.4 | 8.9 | 8.4 |
| $Na_2O$ | 0.2 | 0.2 | 0.2 | 0.7 | 0.2 |
| $K_2O$ | 0.6 | 0.4 | | | 0.4 |
| MgO | 1.9 | 1.8 | 1.2 | 2.0 | 1.7 |
| ZnO | 1.5 | 1.2 | 0.6 | 1.9 | 1.3 |
| CaO | 0 | 0 | 1.0 | 0 | 0 |
| BaO | 0 | 0 | 0.3 | 0 | 0 |
| $Al_2O_3$ | 18.1 | 18.6 | 19.0 | 17.9 | 18.5 |
| $SiO_2$ | 61.9 | 63.8 | 61.4 | 61.5 | 61.5 |
| $P_2O_5$ | 3.9 | 2.4 | 3.9 | 3.8 | 4.7 |
| $TiO_2$ | 2.1 | 1.9 | 1.9 | 2.0 | 2.0 |
| $ZrO_2$ | 1.1 | 1.1 | 1.1 | 1.0 | 1.1 |
| $As_2O_3$ | 0.2 | 0.1 | 0.2 | 0.2 | 0.1 |
| Total | 100.1 | 100.0 | 100.2 | 99.9 | 99.9 |
| $SiO_2 + Al_2O_3 + P_2O_5$ | 83.9 | 84.8 | 84.3 | 83.2 | 84.7 |
| $SiO_2 + (4.6 \times Al_2O_3)$ | 145.2 | 149.4 | 148.8 | 143.8 | 146.6 |
| Temperature [° C.] | 810 | | 810 | | 780 |
| Duration [days] | 8 | | 5 | | 5 |
| CTE(0; +50° C.) [ppm/K] | 0.050 | | 0.031 | | 0.02 |
| Zero crossing CTE [° C.] | | | 42 | | 56 |
| Plateau position [° C.] | | | | | |
| 0 ± 0.015 ppm/K | | | | [35; 64] | |
| 0 ± 0.01 ppm/K | | | | [43; 62] | |
| 0 ± 0.005 ppm/K | | | | | |
| 15 ppb plateau width | | | | | 29K |
| 10 ppb plateau width | | | | | 19K |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A precision component comprising at least one inorganic material whose differential CTE in a temperature interval $T_P$ having a width of at least 40 K is less than 0±0.015 ppm/K and/or in a temperature interval $T_p$ having a width of at least 50 K is less than 0±0.025 ppm/K,
    wherein the inorganic material is a LAS-glass-ceramic comprising a main crystal phase comprising a high-quartz solid solution,
    wherein the LAS-glass-ceramic comprises $Li_2O$ in a range from 7 to 12 mol %, and
    wherein
    if $Al_2O_3 < 17.0$ mol %, then
        $SiO_2$ 64.0-65.6 mol %, and
        30.7≤(molar amount of $SiO_2$-(2 times molar amount of $Al_2O_3$))<34.0;
    or
    if $Al_2O_3 \geq 17.0$ mol %, then
        $SiO_2$ 62.0-66.0 mol %, and
        142.5≤(molar amount of $SiO_2$+(4.6 times molar amount of $Al_2O_3$)) ≤149.0.

2. The precision component according to claim 1, where the temperature interval $T_P$ is in a range from −10 to +100° C.

3. The precision component according to claim 1, where a CTE-T curve of the precision component in a temperature interval $T_P$ having a width of at least 30 K has a gradient of at most ±10 × $10^{-4}$ ppm/$K^2$.

4. The precision component according to claim 1, having an edge length or a diameter of at least 100 mm and/or less than 500 mm and/or a thickness of less than 50 mm and/or at least 1 mm.

5. The precision component according to claim 1, where the precision component is selected from the group consisting of astronomic mirrors, mirrors for EUV lithography, reticle masks for EUV lithography, reference frames or grid plates for microlithography, mirrors or prisms for LCD lithography, and components for metrology or spectroscopy.

6. A method of using of a precision component in astronomy, in precision measurement technology, in LCD lithography or in microlithography, comprising making precision measurements with the precision component of claim 1.

7. An astronomic mirror comprising the precision component of claim 1.

8. A stepper for LCD lithography or for microlithography comprising the precision component of claim 1.

9. The precision component according to claim 1, wherein the precision component comprises a glass-ceramic comprising the following composition (in mol % based on oxide):

| | |
|---|---|
| SiO$_2$ | 62.0-66.0 |
| Al$_2$O$_3$ | 10-25 |
| P$_2$O$_5$ | 1-10 |
| TiO$_2$ | >0 |
| ZrO$_2$ | 0-5 |
| TiO$_2$ + ZrO$_2$ | ≥2.0 |
| Li$_2$O | 7-12 |
| Na$_2$O | 0-2 |
| K$_2$O | 0-2 |
| MgO | 0.1-5 |
| CaO | 0-5 |
| BaO | 0-5 |
| SrO | 0-5 |
| ZnO | >0-5. |

10. The precision component according to claim 9, where the sum of the molar amounts of ZnO and MgO is at least 2.0 mol %.

11. The precision component according to claim 1, for which applies if molar amount of Al$_2$O$_3$<17.0 mol %, then Al$_2$O$_3$≥15.8 mol %.

12. The precision component according to claim 9, where the sum of the molar amounts of ZnO+MgO +Li$_2$O is at least 10.0 mol %.

13. The precision component according to claim 9, where the sum of the molar amounts of SiO$_2$+Al$_2$O$_3$+P$_2$O$_5$ is 80 to 90 mol %.

14. The precision component according to claim 9, wherein the glass-ceramic comprises at least one of Na$_2$O and K$_2$O in an amount of at least 0.05 mol %.

\* \* \* \* \*